United States Patent
Nguyen et al.

(10) Patent No.: US 10,960,620 B2
(45) Date of Patent: Mar. 30, 2021

(54) DOUBLE VACUUM BAG METHOD AND ADJUSTABLE SUPPORT STRUCTURE

(71) Applicant: Rohr, Inc., Chula Vista, CA (US)

(72) Inventors: Quyen Nguyen, San Diego, CA (US); Gary L. Jones, Banning, CA (US)

(73) Assignee: Rohr, Inc., Chula Vista, CA (US)

( * ) Notice: Subject to any disclaimer, the term of this patent is extended or adjusted under 35 U.S.C. 154(b) by 282 days.

(21) Appl. No.: 15/939,995

(22) Filed: Mar. 29, 2018

(65) Prior Publication Data
US 2019/0299550 A1   Oct. 3, 2019

(51) Int. Cl.
| | | |
|---|---|---|
| *B29C 73/12* | (2006.01) | |
| *B29C 70/74* | (2006.01) | |
| *B29C 70/44* | (2006.01) | |
| B29L 31/30 | (2006.01) | |
| B29K 105/08 | (2006.01) | |

(52) U.S. Cl.
CPC ............ *B29C 73/12* (2013.01); *B29C 70/44* (2013.01); *B29C 70/74* (2013.01); *B29K 2105/089* (2013.01); *B29L 2031/3076* (2013.01)

(58) Field of Classification Search
CPC .......... B29C 73/12; B29C 70/44; B29C 70/74
See application file for complete search history.

(56) References Cited

U.S. PATENT DOCUMENTS

| | | | |
|---|---|---|---|
| 5,876,546 A | 3/1999 | Cloud | |
| 6,761,783 B2* | 7/2004 | Keller | B29C 43/12 156/286 |
| 7,186,367 B2 | 3/2007 | Hou et al. | |
| 8,752,293 B2 | 6/2014 | Jones et al. | |
| 8,936,695 B2 | 1/2015 | Rotter et al. | |
| 8,986,479 B2* | 3/2015 | Evens | B29C 73/10 156/94 |
| 9,296,187 B2 | 3/2016 | Pham et al. | |
| 9,707,705 B2 | 7/2017 | Louie et al. | |

(Continued)

FOREIGN PATENT DOCUMENTS

EP    2087990    8/2009

OTHER PUBLICATIONS

Khan et al., "Effect of double vacuum bagging (DVB) in quickstep processing on the properties of 977-2A carbon/epoxy composites"; First published Apr. 25, 2013, Wilely Online Library, Volumn 34, Issue 6, Polymer composites, p. 947 under subtitle "Cure Cycyle Profile". (Year: 2013).*

*Primary Examiner* — Jeffry H Aftergut
*Assistant Examiner* — Jaeyun Lee
(74) *Attorney, Agent, or Firm* — Getz Balich LLC (57) ABSTRACT

A method is provided for working on a composite body. This method includes: disposing material within an aperture in the composite body, the material comprising fiber reinforcement and uncured resin, and the aperture extending into the composite body from a non-planar surface; forming a first chamber between the composite body and a first bag member, the material within the first chamber; disposing a support structure on the first bag member, the support structure overlapping the material; forming a second chamber between the first bag member and a second bag member, the support structure within the second chamber; drawing a vacuum of a first amount in the first chamber; and drawing a vacuum of a second amount in the second chamber.

16 Claims, 9 Drawing Sheets

(56) References Cited

U.S. PATENT DOCUMENTS

| | | |
|---|---|---|
| 9,770,871 B2 | 9/2017 | Brennan et al. |
| 2007/0063393 A1 | 3/2007 | Vernin et al. |
| 2008/0268208 A1 | 10/2008 | Martin et al. |
| 2013/0341816 A1 | 12/2013 | Bergmann |
| 2017/0190078 A1 | 7/2017 | Witte et al. |

* cited by examiner

DOUBLE VACUUM BAG METHOD AND ADJUSTABLE SUPPORT STRUCTURE

BACKGROUND

1. Technical Field

This disclosure relates generally to composite materials and, more particularly, to a double vacuum bag method for consolidating composite material and a support structure for use therewith.

2. Background Information

Various methods are known in the art for laying up and curing composite material. An example of such known methods is disclosed in U.S. Pat. No. 7,186,367. While these known methods have various advantageous, there is still room in the art for improvement.

SUMMARY OF THE DISCLOSURE

According to an aspect of the present disclosure, a method is provided for working on a composite body with a non-planar surface. This method includes disposing material within an aperture in the composite body. The material includes fiber reinforcement and uncured resin. The aperture extends into the composite body from the non-planar surface. A first chamber is formed between the composite body and a first bag member, the material within the first chamber. A support structure is disposed on the first bag member. The support structure overlaps the material. A second chamber is formed between the first bag member and a second bag member. The support structure is within the second chamber. A vacuum of a first amount is drawn in the first chamber. A vacuum of a second amount is drawn in the second chamber, where the second amount is different from the first amount.

According to another aspect of the present disclosure, another method is provided for working on a composite body. This method includes disposing material on the composite body. The material includes fiber reinforcement and uncured resin. A first chamber is provided between the composite body and a first bag member. The material is within the first chamber. A support structure is disposed adjacent the first bag member, where the support structure overlaps the material and is adaptable to engage and conform to a surface of the composite body. A second chamber is provided between the first bag member and a second bag member. A vacuum of a first amount is drawn in the first chamber. A vacuum of a second amount is drawn in the second chamber, where the second amount is different from the first amount. The support structure is operable to maintain an open cavity between the first bag member and the second bag member during the drawing of the vacuums in the first and the second chambers.

According to still another aspect of the present disclosure, an assembly is provided for repairing an aperture extending into a composite body from a non-planar surface of the composite body. This assembly includes a first bag member, a second bag member and a support structure. The first bag member is configured to attach to the non-planar surface of the composite body so as to form a first vacuum chamber with the composite body. The second bag member is configured to attach to the first bag member so as to form a second vacuum chamber with the first bag member. The first bag member is further configured to fluidly separate the first vacuum chamber from the second vacuum chamber. The support structure is configured to be disposed within the second vacuum chamber. The support structure is further configured to conform to the non-planar surface of the composite body.

The first bag member, the second bag member and the support structure may be further configured such that an air gap extends between the first bag member and a base of the support structure when the first chamber is under a vacuum of a first amount and when the second chamber is under a vacuum of a second amount.

The support structure may include a plurality of supports. Each of the supports may extend between and thereby is adapted to separate the base and the first bag member.

The support structure may include a base and a plurality of support legs. Each of the support legs may extend away from the base and/or may be adapted to engage the first bag member.

A first of the support legs may include an adjustable support leg with a swivel foot.

An air gap may extend between the first bag member and a base of the support structure while the first chamber is under the vacuum of the first amount and while the second chamber is under the vacuum of the second amount.

The support structure may include a plurality of supports. Each of the supports may extend between and thereby separates the base and the first bag member.

The support structure may include a base and a plurality of support legs. Each of the support legs may extend away from the base and/or engage the first bag member.

A first of the support legs may be configured as or otherwise include an adjustable support leg.

A length of the first of the support legs may be adjustable.

The first of the support legs may have a base surface. An angular orientation of the base surface relative to a plane of the base may be adjustable.

A first of the support legs may include a swivel foot that engages the first bag member.

The method may further include adjusting the support structure to conform to a non-planar exterior surface of the first bag member.

The first amount may be lower or greater than the second amount.

A vacuum pressure within the first chamber may be more or less than a vacuum pressure within the second chamber.

A first pressure differential may be applied across the first bag member when the vacuum of the first amount is drawn in the first chamber. A second pressure differential may be applied across the second bag member when the vacuum of the second amount is drawn in the second chamber.

The composite body may be configured as or otherwise include a component of an aircraft.

The drawing of the vacuum of the first amount in the first chamber and the drawing of the vacuum of the second amount in the second chamber may be performed while the composite body is configured with the aircraft.

The at least partially curing may be performed while the composite body is configured with the aircraft.

The uncured resin may be at least partially cured while the first chamber is under the vacuum of the first amount and while the second chamber is under the vacuum of the second amount. Alternatively, the uncured resin may be at least partially cured after the vacuum of the first amount in the first chamber is changed or released and/or after the vacuum of the second amount in the second chamber is changed or released.

The method may also include a step of at least partially curing the uncured resin while the first chamber is under the vacuum of the first amount and while the second chamber is under the vacuum of the second amount.

The foregoing features and the operation of the invention will become more apparent in light of the following description and the accompanying drawings.

DETAILED DESCRIPTION

Figure 1:
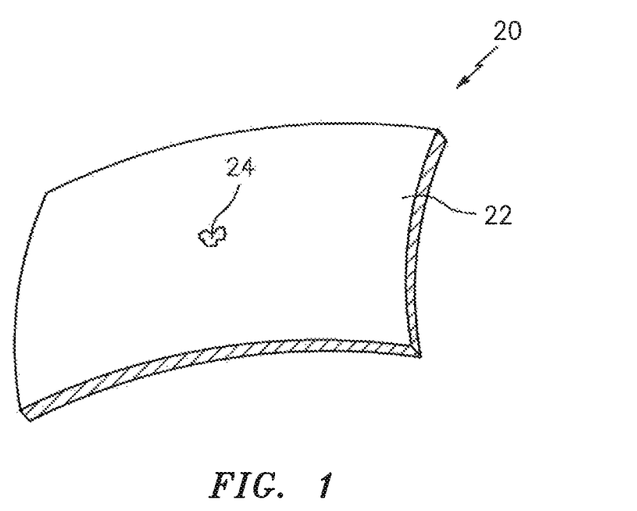
FIG. 1 is a perspective illustration of a portion of a composite body with a non-planar surface, in accordance with various embodiments.

The present disclosure includes methods and devices for repairing or otherwise working on a composite body. A portion of such a composite body 20 is shown in FIG. 1. This composite body 20 may be a panel or other structure of a nacelle for an aircraft propulsion system. The composite body 20, for example, may be configured as or may be part of an exterior skin for an inlet structure, a fan cowl, a translating sleeve or an inner fixed structure of the nacelle. Alternatively, the composite body 20 may be a panel or other structure of another component for an aircraft. The composite body 20, for example, may be configured as or may be part of an exterior skin of an engine pylon, a wing or a fuselage of the aircraft. Still alternatively, the composite body 20 may be a panel or other structure of a gas turbine engine. The composite body 20, for example, may be configured as or may be part of an airfoil or a liner in the gas turbine engine. The methods and systems of the present disclosure, however, are not limited to aircraft applications and may be used to work on various other types and configurations of composite bodies. A portion or an entirety of the composite body 20 may have a convex geometry as illustrated in FIG. 1. In addition or alternatively, a portion or the entirety of the composite body 20 may have a concave geometry. In further addition to or alternatively, a portion or the entirety of the composite body may have a flat/planar geometry.

The composite body 20 may be constructed from fibrous material within a resin matrix. Examples of the fibrous material include, but are not limited to, fiberglass material, carbon fiber material, aramid material (e.g., Kevlar® fibers) or a combination of at least (or only) two or more of the foregoing fibrous materials. The resin matrix may include a thermoset resin.

The composite body 20 of FIG. 1 is configured with a non-planar surface 22; e.g., curved exterior surface. Repairing an aperture 24 (e.g., ply layups to fill a damaged area) that extends into the composite body 20 from the non-planar surface 22 using traditional repair techniques can be inefficient leading to higher porosity within the repair layup and result in repairs with lower strength properties at the repair location, especially where the repair is attempted on site— for example, where a panel of a nacelle is attempted to be repaired while the propulsion system remains on-wing. Successful onsite repairs may be accomplished, however, using the methods and devices of the present disclosure as described below. That said, the methods and devices of the present disclosure are not limited to repairing or otherwise working on composite bodies onsite. For example, the methods and devices of the present disclosure may be performed in a controlled environment.

Figure 2:
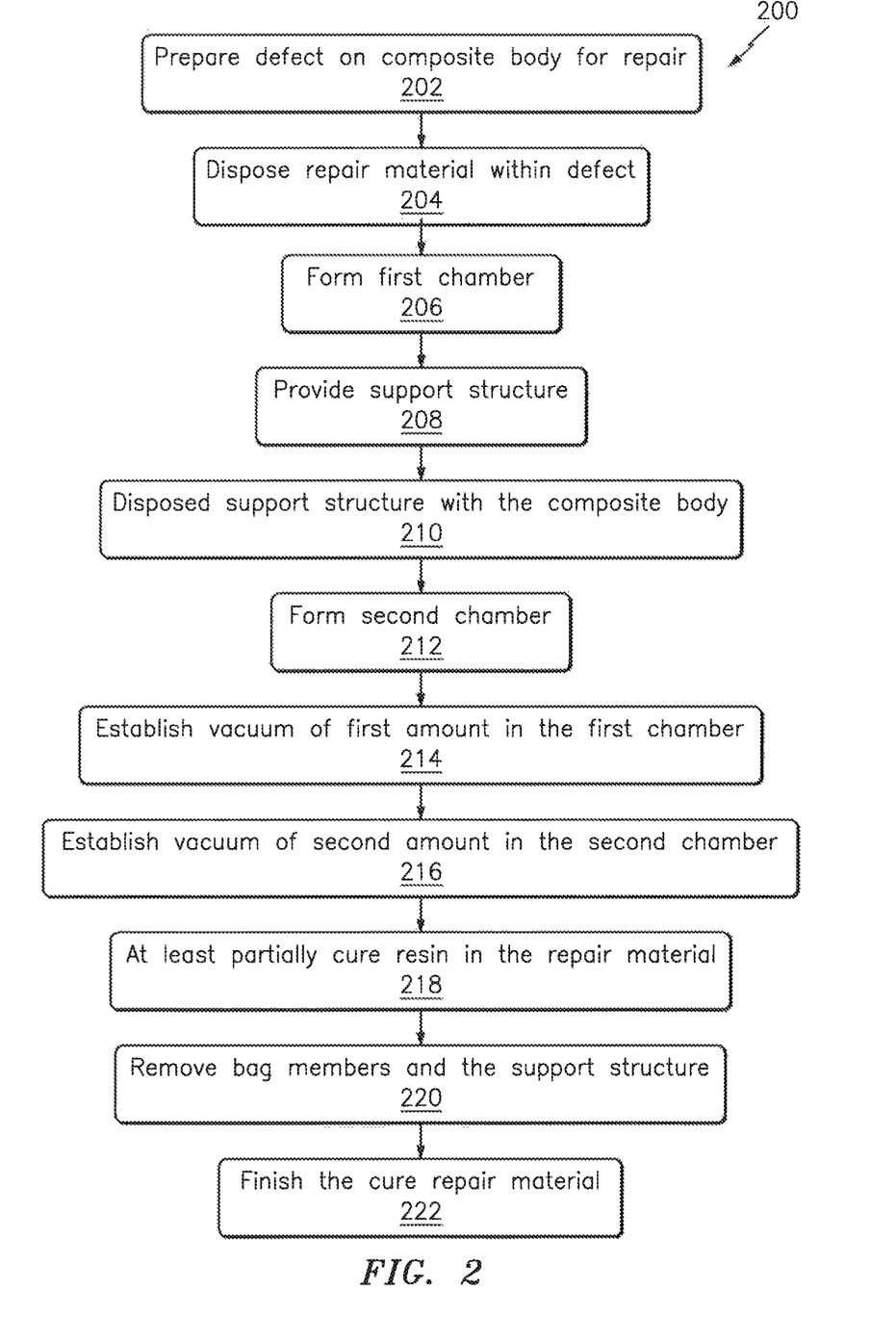
FIG. 2 is a flow diagram of a method for repairing a defect in the composite body, in accordance with various embodiments.

FIG. 2 is a flow diagram of an exemplary method 200 for repairing a defect in a composite body such as the composite body 20 of FIG. 1. In step 202, the defect, here the aperture 24, is prepared for repair. For example, the aperture 24 may be cleaned. The aperture 24 may also or alternatively be machined out to a greater size in order to remove, for example, surrounding damaged/fatigued composite material.

Figure 3:
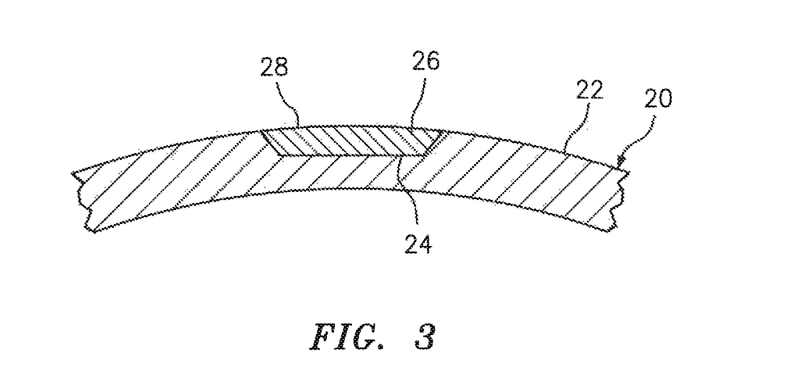
FIG. 3 is a sectional illustration of the composite body portion with repair material in a first configuration, in accordance with various embodiments.
Figure 4:
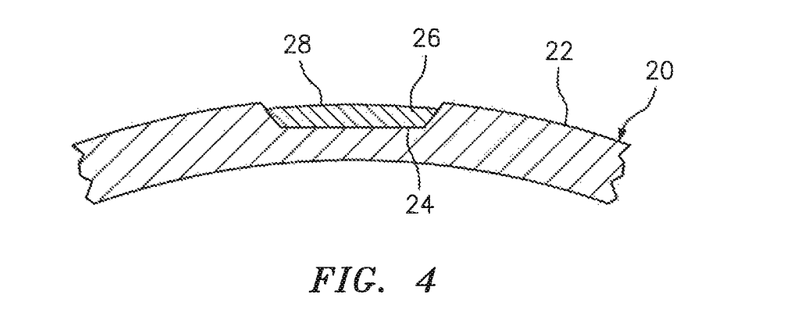
FIG. 4 is a sectional illustration of the composite body portion with repair material in a second configuration, in accordance with various embodiments.
Figure 5:
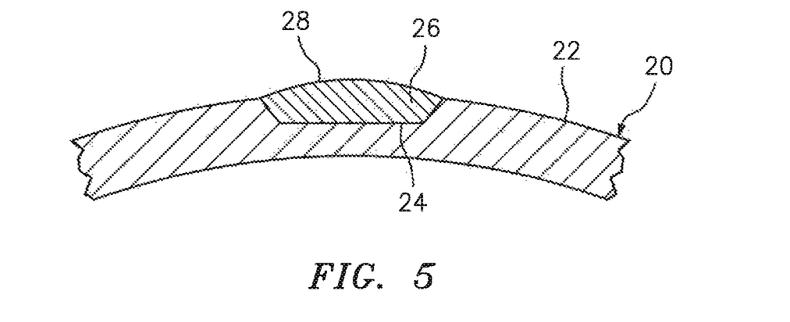
FIG. 5 is a sectional illustration of the composite body portion with repair material in a third configuration, in accordance with various embodiments.

In step 204, repair material 26 is disposed within the aperture 24. This repair material 26 may completely fill the aperture 24 with layers of impregnated fabric such that an exterior surface 28 of the repair material 26 is flush with the non-planar surface 22 as shown in FIG. 3. Alternatively, the repair material 26 may partially fill the aperture 24 with layers of impregnated fabric such that the exterior surface 28 is recessed inward from the non-planar surface 22 as shown in FIG. 4. Additional layer(s) of repair material may be added in subsequent step(s) to completely fill the aperture 24 as required. Still alternatively, the repair material 26 may over-stack the aperture 24 such that the exterior surface 28 protrudes outward from the non-planar surface 22 as shown in FIG. 5. The exterior surface 28 of the repair, of course, may later be machined down to become flush with the non-planar surface 22 as required.

Figure 6:
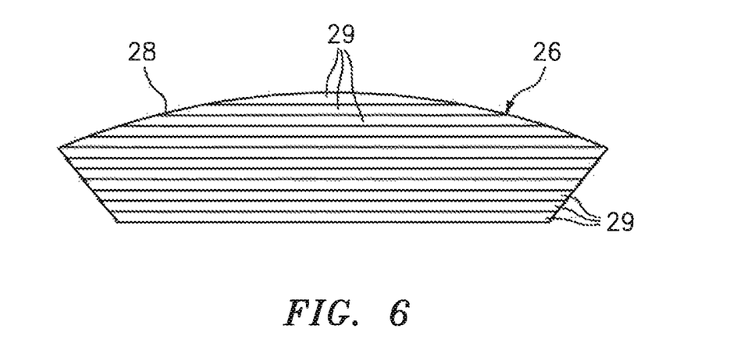
FIG. 6 is a sectional illustration of the repair material with layers of fibrous material in a resin matrix, in accordance with various embodiments.

The repair material 26 of FIG. 6 includes one or more layers 29 of fibrous material and uncured resin; e.g., fiber reinforcement within an uncured resin matrix. The repair material 26, for example, may be pre-preg (fiber pre-impregnated with resin) material. Additionally, the fibrous material may be manually impregnated with the uncured resin and then laid up "wet" in the aperture 24. Alternatively, the fibrous material may be laid up in the aperture 24 and subsequently impregnated with the uncured resin. Examples of the fibrous material include, but are not limited to, fiberglass material, carbon fiber material, aramid material (e.g., Kevlar® fibers) or a combination of at least (or only) two or more of the foregoing fibrous materials. The resin matrix may include a thermoset resin. The repair material 26 may have the same or similar composition to that of the composite body 20. Alternatively, the repair material 26 may have a different, but complimentary, composition to that of the composite body 20.

Figure 7:
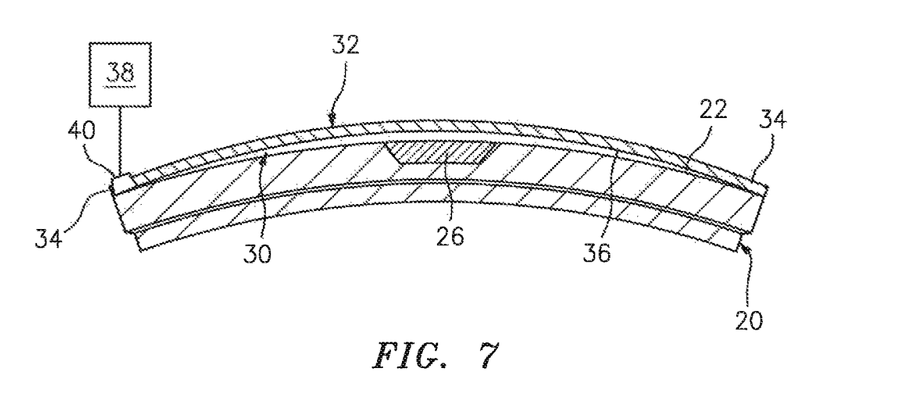
FIG. 7 is a sectional illustration of the composite body portion with the repair material and a first bag member, in accordance with various embodiments.
Figure 8:
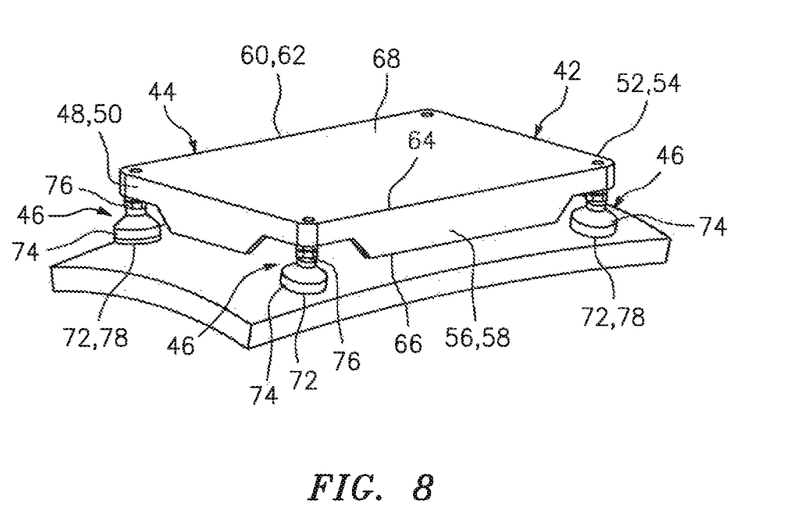
FIG. 8 is a perspective illustration of a support structure arranged with an element having a non-planar surface, in accordance with various embodiments.
Figure 9:
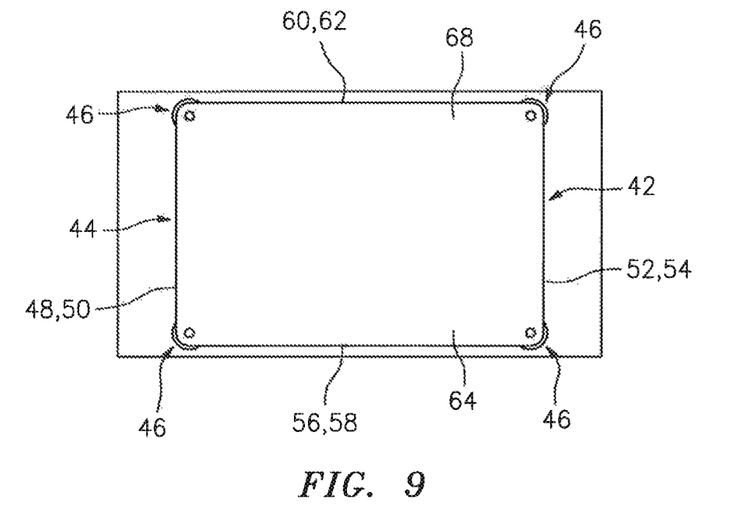
FIG. 9 is a top view illustration of the support structure and the element of FIG. 8, in accordance with various embodiments.
Figure 10:
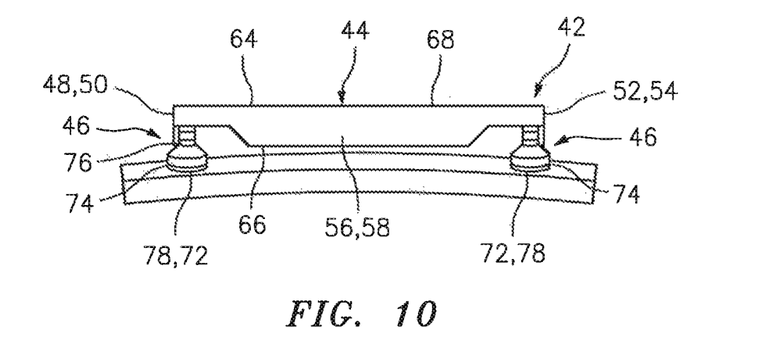
FIG. 10 is a first side view of the support structure and the element of FIG. 8, in accordance with various embodiments.
Figure 11:
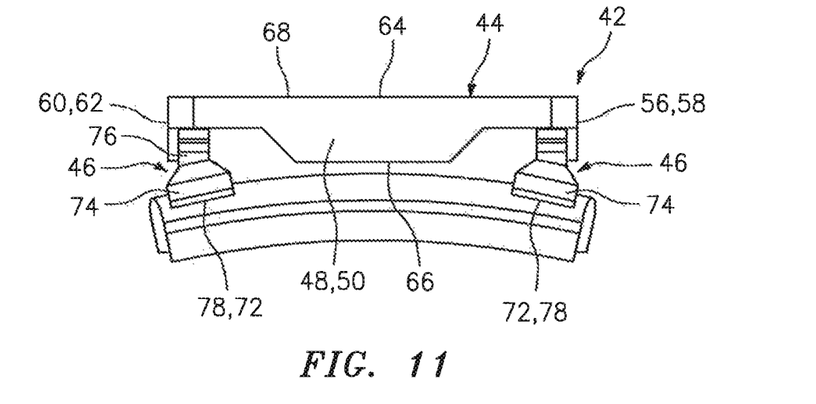
FIG. 11 is a second side view of the support structure and the element of FIG. 8, in accordance with various embodiments.
Figure 12:
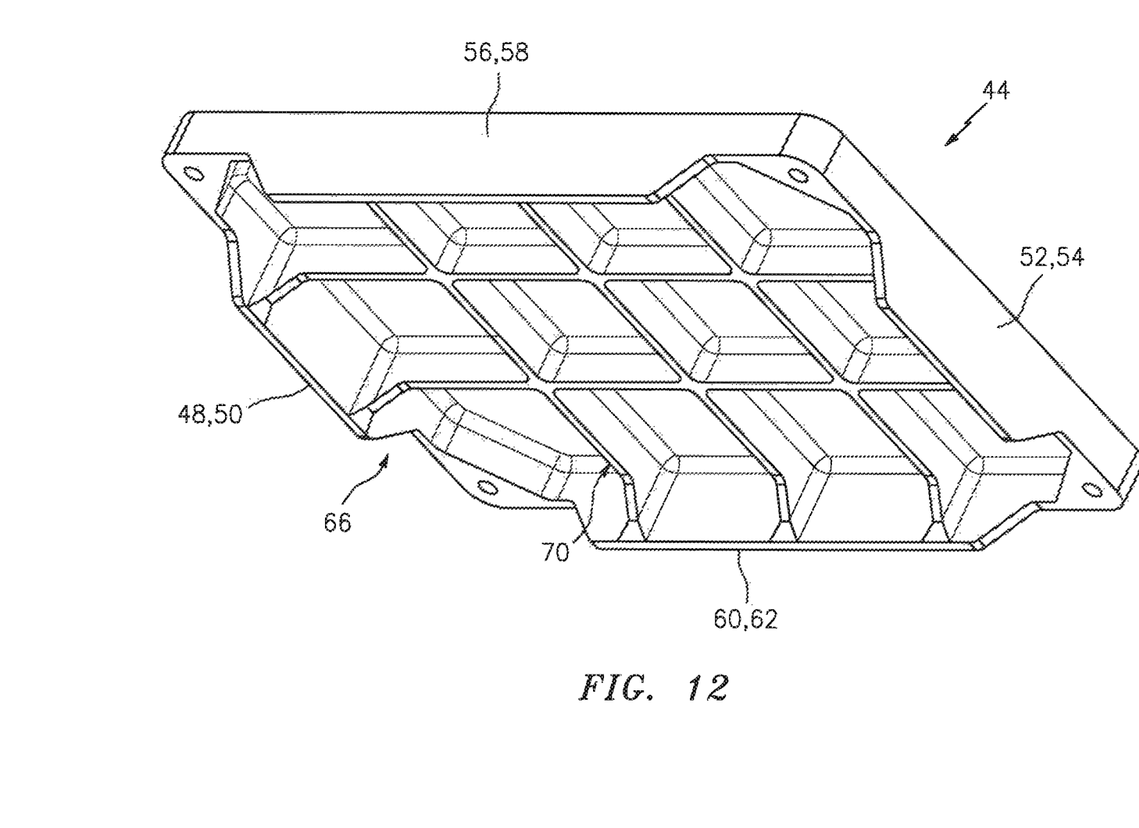
FIG. 12 is a bottom view perspective illustration of a base of the support structure.

In step 206, a first chamber 30 is formed. This first chamber 30 may be formed using at least a first (e.g., inner) bag member 32 as shown in FIG. 7. This first bag member 32 of FIG. 7 is constructed from a flexible/compliant, non-porous sheet of material. An outer periphery 34 of the first bag member 32 is temporarily attached (e.g., bonded directly or indirectly) to the exterior surface 22 so as to form the first chamber 30 between the exterior surface 22 of the composite body 20 and an interior surface 36 of the first bag member 32. The first chamber 30 is thereby defined by and extends between the surfaces 22 and 36. The first chamber 30 of FIG. 7 is fluidly coupled with a vacuum source 38 via at least one coupler 40 (e.g., orifice) in the first bag member 32. The repair material 26 is located completely within the first chamber 30.

In step 208, a support structure 42 is provided. An exemplary embodiment of this support structure 42 is illustrated in FIGS. 8-12. This exemplary support structure 42 is configured as a rigid, but adjustable, structure. The support structure 42, for example, includes a rigid base 44 and one or more base supports 46.

The base 44 extends longitudinally between a first edge surface 48 at a first side 50 and a second edge surface 52 at a second side 54. The base 44 extends laterally between a third edge surface 56 at a third side 58 and a fourth edge surface 60 at a fourth side 62, where the edge surfaces 56 and 60 extend longitudinally between the edge surfaces 48 and 52. The base 44 and its edge surfaces 48, 52, 56 and 60 extend vertically between an exterior end 64 and an interior end 66. The base 44 includes an exterior support surface 68 at the exterior end 64 that is substantially flat and planar. In other embodiments, however, the exterior support surface 68 may be non-planar; e.g., have a slight curvature in the longitudinal and/or lateral direction. The base 44 may include an interior support truss 70 (see FIG. 12), which is generally located at the interior end 66 and is provided to increase the structural rigidity of the base 44.

Figure 13:
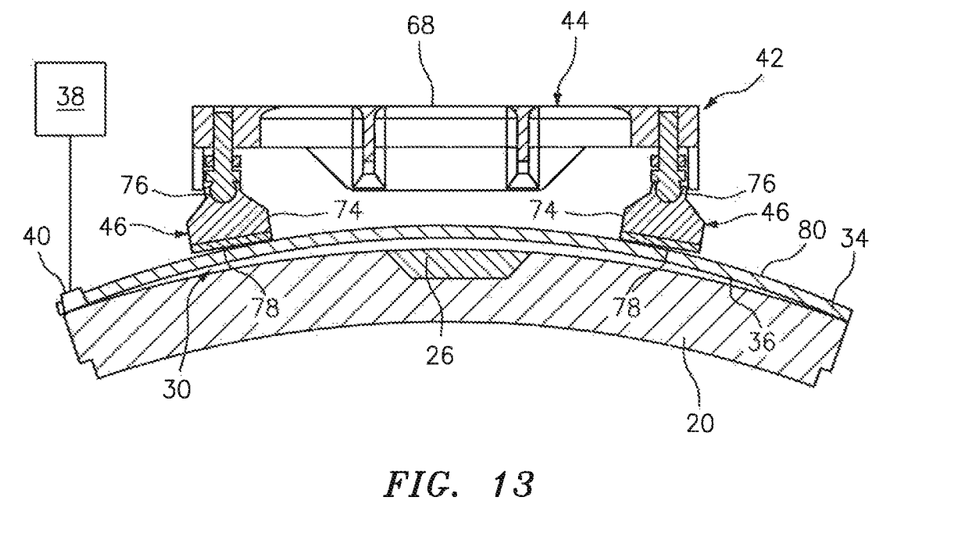
FIG. 13 is a sectional illustration of the assembly of FIG. 7 configured additionally with the support structure, in accordance with various embodiments.

The supports 46 are arranged at corners of the base 44. Each support 46 is connected to (e.g., attached to or formed integral with) the base 44 and projects outward from the interior end 66 to a distal end 72 thereof. One or more or each of the supports 46 of FIGS. 8, 10 and 11 (see also FIG. 13) is configured as an adjustable support leg. Each support 46, for example, is configured with a foot 74 (e.g., a swivel foot) at the distal end 72. This foot 74 may be screwed or unscrewed to decrease or increased a vertical length of the respective support 46. The foot 74 may also or alternatively include or otherwise be configured with a joint 76 (see also FIG. 13) such as a spherical joint. The foot 74 thereby may be pivoted about the joint 76 such that an angular orientation of a base surface 78 of the foot 74 may be adjusted (e.g., moved) relative to a plane of a surface of the base 44, such as the exterior support surface 68.

The afore-described adjustability enables the support structure 42 to be configured with and conform to composite bodies with complex surfaces such as, for example, the composite body 20 with its non-planar surface 22. The support structure 42 is adaptable to a convex surface, a concave surface, as well as an undulating or flat surface, with possibly some limitations to a surface with high angularity. More particularly, this adjustability enables the base surfaces 78 of the supports 46 to be (e.g., fully) planted/seated against a corresponding surface as described below in further detail. As a result, a single support structure may be utilized during repair of composite bodies with various different exterior surface geometries. By contrast, if the supports 46 were not adjustable (e.g., extendable, pivotable or otherwise movable), then such a non-adjustable support structure would need to be specifically tailored for engagement with a specific surface geometry to ensure the supports 46 are fully seated against that surface. It is worth noting, a partially seated support may result in non-adjustable support structure movement during the repair and/or subjecting the composite structure to stress concentrations during the vacuum process described below.

Figure 15:
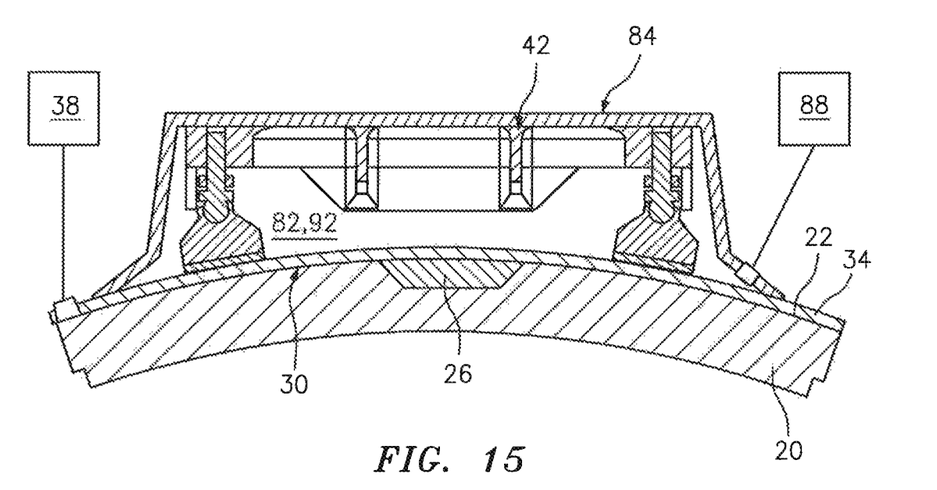
FIG. 15 is a sectional illustration of the assembly of FIG. 14 with a vacuum being drawn in a first chamber, in accordance with various embodiments.

In step 210, the support structure 42 is disposed on the composite body 20 adjacent the first chamber 30. The support structure 42 of FIG. 13, for example, is disposed adjacent the first bag member 32 and, more particularly, on an exterior surface 80 of the first bag member 32. The support structure 42 is arranged such that a center portion of its base 44 is approximately aligned with the repair material 26 and the aperture 24. The support structure 42 and its base 44 thereby laterally and longitudinally overlap the repair material 26 and the aperture 24. To ensure proper placement of the support structure 42, one or more of the supports 46 may be adjusted such that the base surfaces 78 of the supports 46 are engaged (e.g., in full contact) with the exterior surface 80 of the first bag member 32, which may generally have a similar or the same surface geometry as the non-planar surface 22 particularly where the first bag member 32 is lying flat against the composite body 20; e.g., see FIG. 15.

Figure 14:
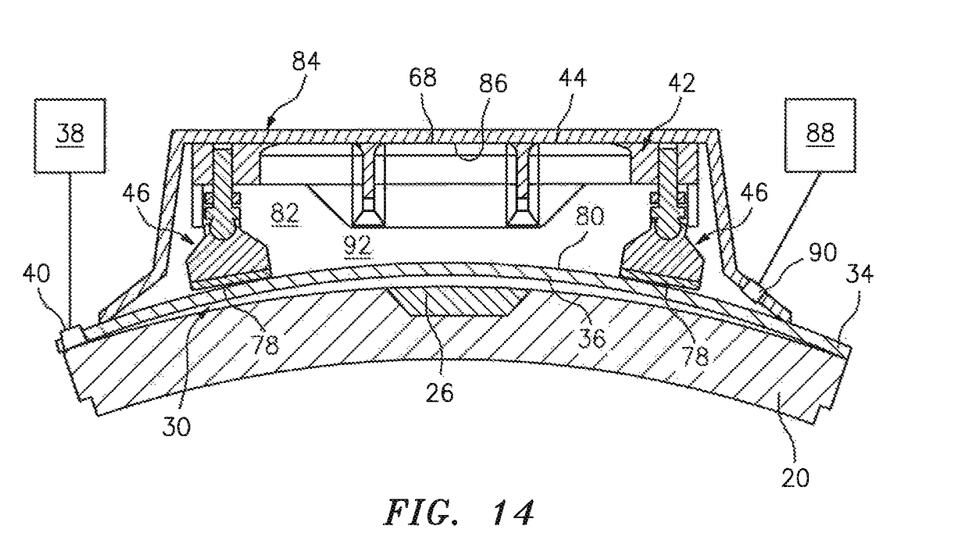
FIG. 14 is a sectional illustration of the assembly of FIG. 13 configured additionally with a second bag member, in accordance with various embodiments.

In step 212, a second chamber 82 is formed. This second chamber 82 may be formed using at least a second (e.g., outer) bag member 84 as shown in FIG. 14. This second bag member 84 of FIG. 14 is constructed from a flexible/compliant, non-porous sheet of material. An outer periphery of the second bag member 84 is temporarily attached (e.g., bonded directly or indirectly) to the exterior surface 80 of the first bag member 32 so as to form the second chamber 82 between the exterior surface 80 and an interior surface 86 of the second bag member 84. The second chamber 82 is thereby defined by and extends between the surfaces 80 and 86. The second chamber 82 of FIG. 14 is fluidly coupled with a vacuum source 88 via at least one coupler 90 (e.g., orifice) in the second bag member 84, which vacuum source 88 may be the same or different than the vacuum source 38 coupled with the coupler 40.

The support structure 42 is located completely within the second chamber 82. The interior surface 86 of FIG. 14, for example, lays against and engages the exterior support surface 68 of the support structure 42 while the base surfaces 78 of the supports 46 engage the exterior surface 80 of the first bag member 32. With this arrangement, the support structure 42 is operable to provide and maintain an air gap 92/separation between select portions of the first and the second bag members 32 and 84. This air gap 92 is generally aligned with and, thus, longitudinally and laterally overlaps an entirety of the repair material 26.

In step 214, a vacuum of a first amount is drawn in the first chamber 30. The vacuum source 38 of FIG. 15, for example, pumps gas out of the first chamber 30 causing the first bag member 32 to be drawn up against the non-planar surface 22 and the repair material 26. The repair material 26 is thereby compressed against the composite body 20. Note, in some embodiments, this step 214 may be performed prior to performance of the step 208.

Figure 16:
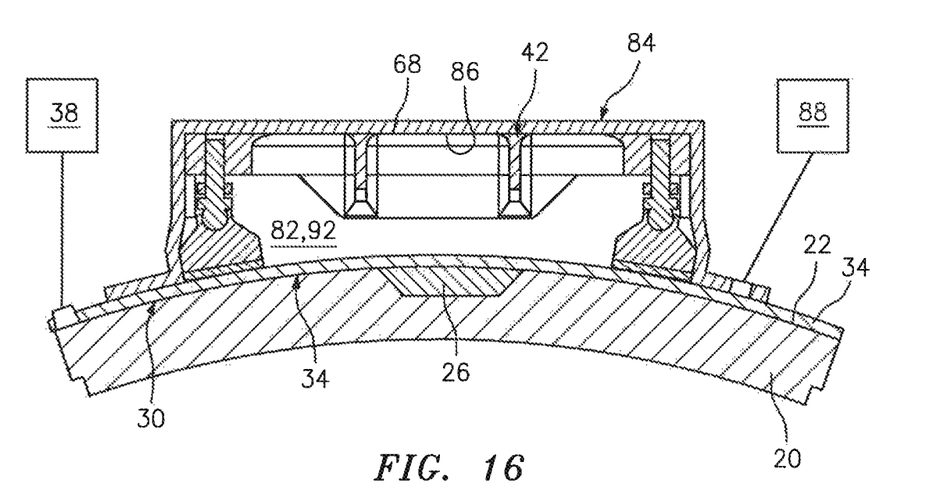
FIG. 16 is a sectional illustration of the assembly of FIG. 15 with a vacuum being drawn in a second chamber, in accordance with various embodiments.

In step 216, a vacuum of a second amount is drawn in the second chamber 82. This second mount may be different (e.g., less, or alternatively greater) than the first amount such that a gas pressure (vacuum pressure) within the second chamber 82 is different (e.g., greater, or alternatively less) than a gas pressure (vacuum pressure) within the first chamber 30. The vacuum source 88 of FIG. 16, for example, pumps gas out of the second chamber 82 causing the second bag member 84 to be drawn up against the support structure 42 and an annular portion of the first bag member 32 that surrounds the support structure 42. As a result, a first pressure differential is applied across the first bag member 32 and a second pressure differential is applied across the second bag member 84. The second pressure differential may be different (e.g., greater, or alternatively less) than the first pressure differential. As a result, the repair material 26 may be subject to a relatively high overall vacuum, while the first bag member 32 subjects the repair material 26 to a relatively low compressive force against the composite body 20. This in turn enables, inter alia, volatiles and/or other gases (e.g., air) to escape from the repair material 26 prior to or during cure. Note, in some embodiments, this step 216 may be performed substantially simultaneously with the performance of the step 214.

In step 218, the uncured resin in the repair material 26 is partially or completely cured. For example, while the vacuums generated during the steps 214 and 216 are being drawn, the repair material 26 may be heated by a heat source (not shown) such that the uncured resin within the repair material 26 is subject to both an elevated temperature and an elevated pressure (as compared to ambient). This heat and pressure may be applied for a duration long enough to partially cure the resin, or completely cure the resin. When the resin is only partially cured, the vacuum within the first and/or the second chambers 30, 82 may be changed for a final curing step. For example, the second chamber 82 may be allowed to go to ambient pressure in order to increases the relative compressive force applied to the repair material 26 during the final curing stage. Additionally, the second chamber 82 can be removed from the setup after volatile extractions is completed, allowing the first chamber 30 to have uniform vacuum pressure and elevated temperature applied during the final cure process of the repair area.

In other embodiments, the uncured resin in the repair material 26 is partially or completely cured after the vacuum(s) generated during the steps 214 and/or 216 is/are changed or released (e.g., the pressure(s) within the chamber(s) 30 and/or 82 go to ambient). For example, the partial or full cure process may initially begin after the vacuum within the chamber 82 is changed (e.g., decreased) or released. In another example, the partial or full cure process may initially begin after both vacuums within the chambers 30 and 82 are changed and/or released.

In step 220, the elements 32, 42 and 84 are removed from the composite body 20. In some embodiments, this step 220 may be performed subsequent to the partial or full curing where, for example, the cure is performed after the vacuums are released.

In step 222, the now cured repair material 26 is finished. For example, the cured repair material 26 may be machined (e.g., sanded) down to be flush with the non-planar surface 22. The exterior surface 28 of the cured repair material 26 may be worked to provide a certain surface finish; e.g., surface roughness.

Figure 17:
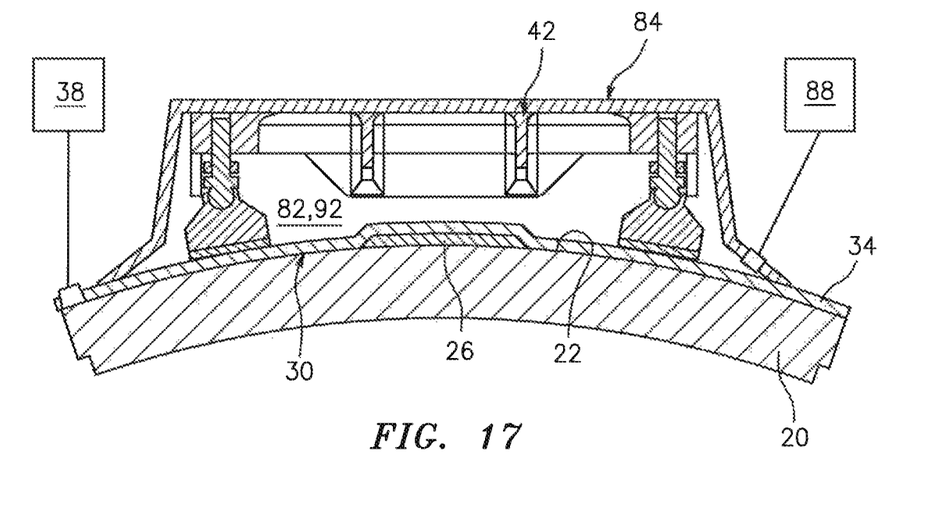
FIG. 17 is a sectional illustration of the assembly of FIG. 15 with an alternative composite body and repair material, in accordance with various embodiments.

In some embodiments, the methods and devices provided above may be performed to buildup a surface, as opposed to fill in an aperture or otherwise repair a defect. An example of such a material buildup is shown in FIG. 17.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A method for working on a composite body with a non-planar surface, the method comprising:
   disposing material within an aperture in the composite body, the material comprising fiber reinforcement and uncured resin, and the aperture extending into the composite body from the non-planar surface;
   forming a first chamber between the composite body and a first bag member, the material within the first chamber;
   disposing a support structure on the first bag member, the support structure overlapping the material;
   forming a second chamber between the first bag member and a second bag member, the support structure within the second chamber;
   drawing a vacuum of a first amount in the first chamber;
   drawing a vacuum of a second amount in the second chamber, the second amount different from the first amount; and
   at least partially curing the uncured resin;
   wherein the support structure comprises a base and a plurality of support legs, each of the support legs extends away from the base and engages the first bag member, a first of the support legs comprises an adjustable support leg, and a length of the first of the support legs is adjustable.

2. The method of claim 1, wherein the uncured resin is at least partially cured while the first chamber is under the vacuum of the first amount and while the second chamber is under the vacuum of the second amount.

3. The method of claim 1, wherein an air gap extends between the first bag member and a base of the support structure while the first chamber is under the vacuum of the first amount and while the second chamber is under the vacuum of the second amount.

4. The method of claim 1, wherein the first of the support legs has a base surface, and an angular orientation of the base surface relative to a plane of the base is adjustable.

5. A method for working on a composite body with a non-planar surface, the method comprising:
   disposing material within an aperture in the composite body, the material comprising fiber reinforcement and uncured resin, and the aperture extending into the composite body from the non-planar surface;

forming a first chamber between the composite body and a first bag member, the material within the first chamber;

disposing a support structure on the first bag member, the support structure overlapping the material;

forming a second chamber between the first bag member and a second bag member, the support structure within the second chamber;

drawing a vacuum of a first amount in the first chamber;

drawing a vacuum of a second amount in the second chamber, the second amount different from the first amount; and at least partially curing the uncured resin;

wherein the support structure comprises a base and a plurality of support legs, each of the support legs extends away from the base and engages the first bag member, and a first of the support legs comprises a swivel foot that engages the first bag member.

6. The method of claim 1, further comprising adjusting the support structure to conform to a non-planar exterior surface of the first bag member.

7. The method of claim 1, wherein the first amount is greater than the second amount.

8. The method of claim 1, wherein a vacuum pressure within the first chamber is less than a vacuum pressure within the second chamber.

9. The method of claim 1, wherein
a first pressure differential is applied across the first bag member when the vacuum of the first amount is drawn in the first chamber; and
a second pressure differential is applied across the second bag member when the vacuum of the second amount is drawn in the second chamber.

10. The method of claim 1, wherein the composite body comprises a component of an aircraft.

11. The method of claim 10, wherein the drawing of the vacuum of the first amount in the first chamber and the drawing of the vacuum of the second amount in the second chamber is performed while the composite body is configured with the aircraft.

12. A method for working on a composite body, the method comprising:

disposing material on the composite body, the material comprising fiber reinforcement and uncured resin;

providing a first chamber between the composite body and a first bag member, the material within the first chamber;

disposing a support structure adjacent the first bag member, the support structure overlapping the material and adaptable to engage and conform to a surface of the composite body, wherein the support structure comprises one or more adjustable supports;

providing a second chamber between the first bag member and a second bag member;

drawing a vacuum of a first amount in the first chamber; and drawing a vacuum of a second amount in the second chamber, the second amount different from the first amount;

wherein the support structure is operable to maintain an open cavity between the first bag member and the second bag member during the drawing of the vacuums in the first and the second chambers.

13. The method of claim 12, further comprising at least partially curing the uncured resin while the first chamber is under the vacuum of the first amount and while the second chamber is under the vacuum of the second amount.

14. The method of claim 12, wherein a first of the one or more adjustable supports comprises a spherical joint.

15. The method of claim 12, wherein a dimension of a first of the one or more adjustable supports is adjustable.

16. The method of claim 12, wherein a first of the one or more adjustable supports comprises a swivel foot.

* * * * *